Patented Mar. 7, 1933

1,900,426

UNITED STATES PATENT OFFICE

JOHANN BÜSDORF AND FRITZ LÖFLUND, OF OFFENBACH-ON-THE-MAIN, GERMANY, ASSIGNORS TO GENERAL ANILINE WORKS, INC., OF NEW YORK, N. Y., A CORPORATION OF DELAWARE

SUBSTITUTED AMINO-DIPHENYLAMINE

No Drawing. Application filed September 16, 1929, Serial No. 393,111, and in Germany October 9, 1928.

The present invention relates to 4-amino-diphenyl-amines substituted in at least one of the positions 3 and 4' and to a process of preparing the same; more particularly it relates to compounds of the following general formula:

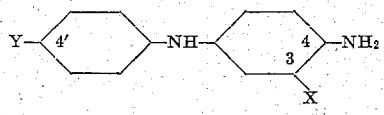

wherein at least one of the hydrogen atoms X and Y is substituted by a monovalent substituent.

These compounds are obtained by causing a nitroso compound of the following general formula:

to act upon a nitroso compound of the following general formula:

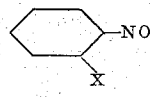

at least one of the hydrogen atoms X and Y being substituted by a monovalent substituent and reducing the condensation product thus formed.

The probable course of the reaction may be represented by the following equation:

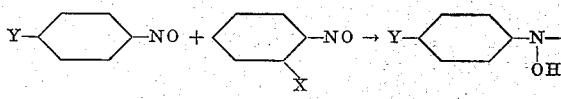

X and Y having the above indicated signification.

It was not to be foreseen that this process would yield uniform amino-diphenylamine compounds since a nitroso-compound easily reacts with a second molecule of the same compound. The present invention allows to produce substituted amino-diphenylamine compounds which could either not or only difficultly be prepared by the hitherto known methods of working.

The products obtainable according to our herein described process are valuable intermediates for the manufacture of dyestuffs.

Especially important compounds of this kind are those new compounds which correspond to the general formula

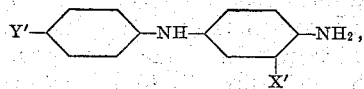

wherein Y' means hydrogen, chlorine or methyl and X' means chlorine, methyl or methoxy.

In order to further illustrate our invention the following examples are given, the parts being by weight and all temperatures indicated in centigrade degrees; but we wish it to be understood that we are not limited to the particular products or reaction conditions mentioned therein.

Example 1

141.5 parts of 4-chloro-1-nitroso-benzene and 121 parts of 2-methyl-1-nitroso-benzene are dissolved while heating in about 1500 parts of glacial acetic acid and the solution is allowed to run at 5° into about 5400 parts of sulfuric acid of 66° Bé. When the condensation is finished the clear dark red solution is poured into ice-water, the clear yellow precipitate is filtered off and washed till being free from acid. This condensation product is dissolved in water and 130 parts of a caustic soda solution of 38° Bé. and filtered from some residue. The dark red solution is mixed at 60° while stirring with a filtered aqueous solution of 360–400 parts of fused sodium sulfide. Then the temperature is slowly raised to 75°. A light colored precipitate is gradually formed. When the coloration of the liquor has completely disappeared the mass is cooled, filtered and the residue is well washed. The new 4'-chloro-4-amino-3-methyl-diphenylamine of the formula:

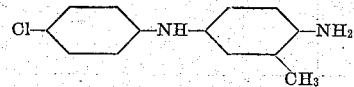

melts at 82–83° and yields with nitrite and a mineral acid a nitroso-diazo-compound.

Example 2

A solution of 43 parts of 4-chloro-1-nitroso-benzene and 41 parts of 2-methoxy-1-nitroso-benzene in about 450 parts of glacial acetic acid is allowed to drop at 0–5° during 2 hours into about 1600 parts of sulfuric acid of 66° Bé. Then the clear dark red solution is poured into ice-water. The yellow precipitate is filtered off and washed. The condensation product which melts when pure at about 144° is dissolved in 2000–3000 parts of a dilute caustic soda solution. The clear dark red solution filtered from some residue is mixed with an aqueous solution of 110 parts of fused sodium sulfide and the mass is warmed to 80° for half an hour, whereby the reduction product precipitates in a solid state and the mother liquor becomes light colored. After the mass has been cooled down the precipitate is filtered, washed and dried. In this manner 4′-chloro-4-amino-3-methoxy-diphenylamine corresponding to the formula:

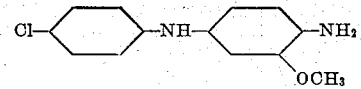

is obtained which melts at 94–95°.

The following table exhibits the melting points of some other compounds prepared in an analogous manner by starting from the ascribed nitroso compounds:—

| Nitroso-benzene substituted in the para position by | Nitroso-benzene substituted in an ortho position by | Melting point of the condensation product | Melting point of the diphenylamine compound obtained | Formula thereof |
|---|---|---|---|---|
| Cl | Cl | 139–140° | 60–61° | Cl—◯—NH—◯—NH₂ / Cl |
| CH₃ | CH₃ | 157–158° | 73–74° | CH₃—◯—NH—◯—NH₂ / CH₃ |
| CH₃ | OCH₃ | ---------- | 94–96° | CH₃—◯—NH—◯—NH₂ / OCH₃ |
| CH₃ | Cl | ---------- | 71–72° | CH₃—◯—NH—◯—NH₂ / Cl |
| Cl | H | 143° | 70–71° | Cl—◯—NH—◯—NH₂ |
| CH₃ | H | 135° | 116–118° | CH₃—◯—NH—◯—NH₂ |
| H | OCH₃ | 153° | 87° | ◯—NH—◯—NH₂ / OCH₃ |
| H | CH₃ | 142° | 70–71° | ◯—NH—◯—NH₂ / CH₃ |

We claim:—

1. As new compounds the substituted amino-diphenylamine derivatives corresponding to the general formula:

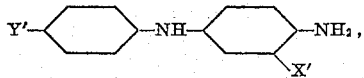

wherein X′ means chlorine, methyl or methoxy and Y′ means hydrogen, chlorine or methyl, which compounds are when dry colored crystallized substances, insoluble in water, having a definite melting point, capable of being diazotized whereby a nitrosodiazo-compound may be formed.

2. As new compounds the chloro-amino-diphenylamine derivatives corresponding to the general formula:

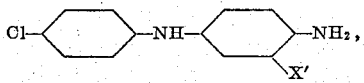

wherein X′ means chlorine, methyl or methoxy, which compounds are when dry colored crystallized substances insoluble in water, having a definite melting point, capable of being diazotized whereby nitrosodiazo compound may be formed.

3. As a new compound, the diphenyl-amine derivative corresponding to the following formula:

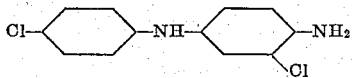

which compound is when dry a colored crystallized substance, insoluble in water, having a melting point of 60° C. to 61° C., capable of being diazotized whereby a nitrosodiazo-compound may be formed.

4. As a new compound, the diphenyl-amine derivative corresponding to the following formula:

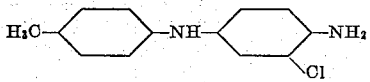

which compound is when dry a colored crystallized substance, insoluble in water, having a melting point of 71° C. to 72° C., capable of being diazotized whereby a nitrosodiazo-compound may be formed.

5. As a new compound, the diphenyl-amine derivative corresponding to the following formula:

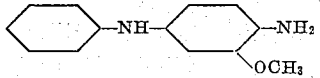

which compound is when dry a colored crystallized substance, insoluble in water, having a melting point of 87° C., capable of being diazotized whereby a nitrosodiazo-compound may be formed.

In testimony whereof, we affix our signatures.

JOHANN BÜSDORF.
FRITZ LÖFLUND.